(12) United States Patent
Guay et al.

(10) Patent No.: US 6,321,218 B1
(45) Date of Patent: Nov. 20, 2001

(54) AUTOMATICALLY DETERMINING DATA THAT IS BEST SUITED FOR INDEX TUNING

(75) Inventors: Todd Guay, Nashua; Gregory Smith, Merrimack; Gaylen Royal, Bedford; Cheryl Mrozienski, Strafford, all of NH (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/256,810

(22) Filed: Feb. 24, 1999

(51) Int. Cl.[7] .................................................. G60F 17/30
(52) U.S. Cl. .................................... 707/2; 714/1; 707/200
(58) Field of Search .............................. 707/2, 200; 714/1

(56) References Cited

U.S. PATENT DOCUMENTS 5,924,088 * 7/1999 Jakobsson et al. ....................... 707/2
5,950,186 * 9/1999 Chaudhuri et al. ....................... 707/2
6,003,022 * 12/1999 Eberhard et al. ......................... 707/2
6,295,653 * 2/2001 Bleizeffer et al. ......................... 707/2

* cited by examiner

Primary Examiner—John Breene
Assistant Examiner—Susan Rayyan
(74) Attorney, Agent, or Firm—Hickman Palermo Truong & Becker LLP; Edward A. Becker

(57) ABSTRACT

An approach for automatically determining database tables that are best suited for index tuning involves analyzing query performance data that specifies an average amount of time required to execute a plurality of queries on the database tables. One or more particular queries are selected from the plurality of queries based upon the query performance data. Data tables required to process the one or more particular queries are selected for index tuning.

28 Claims, 4 Drawing Sheets

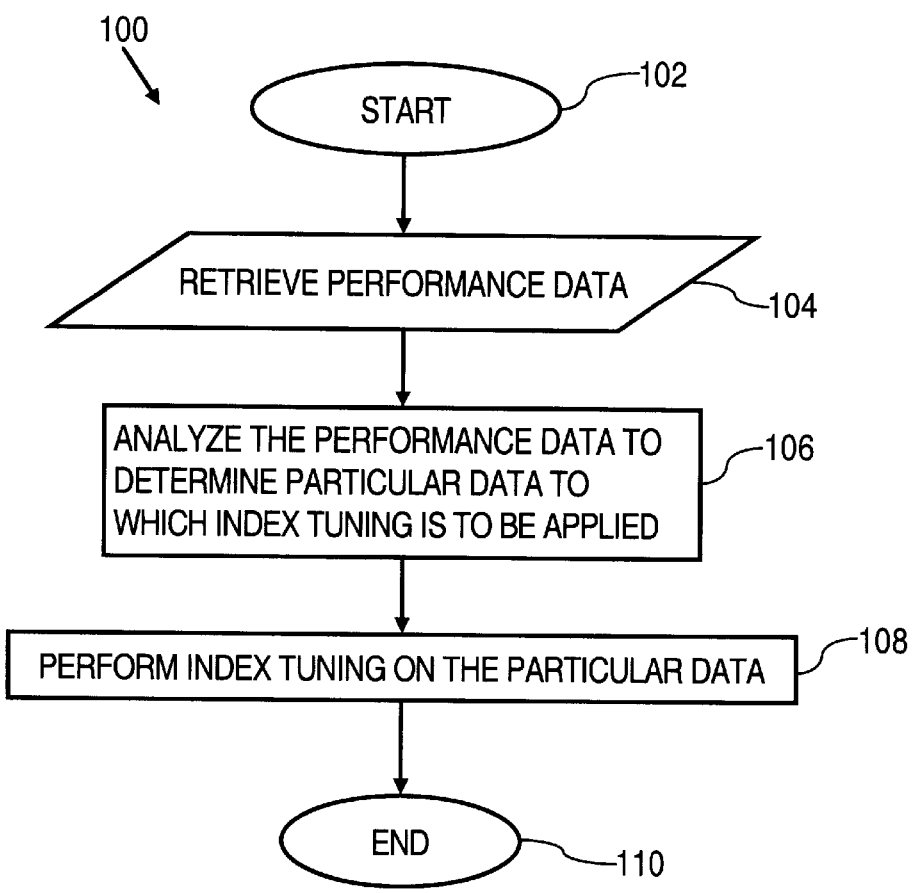
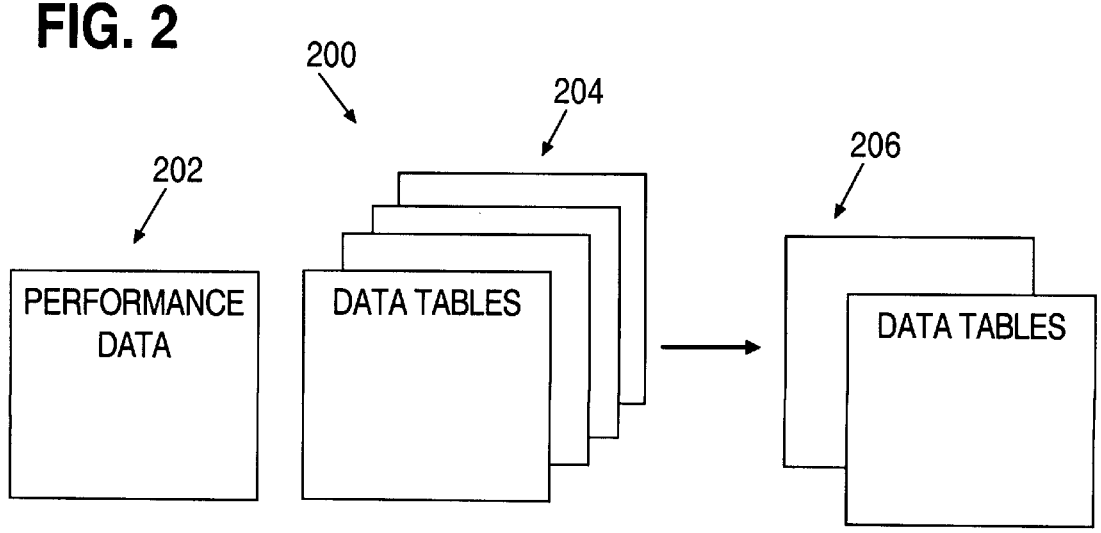

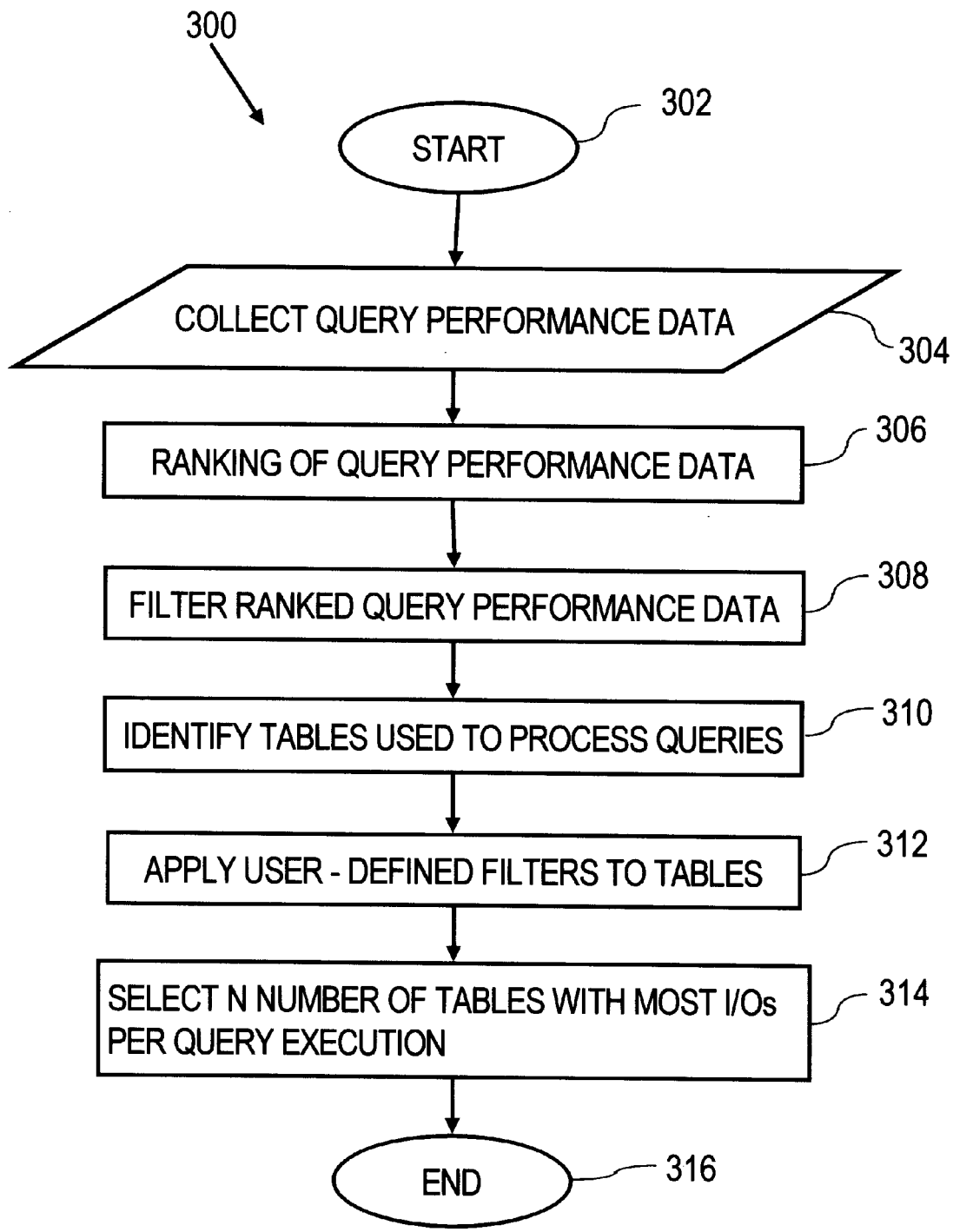

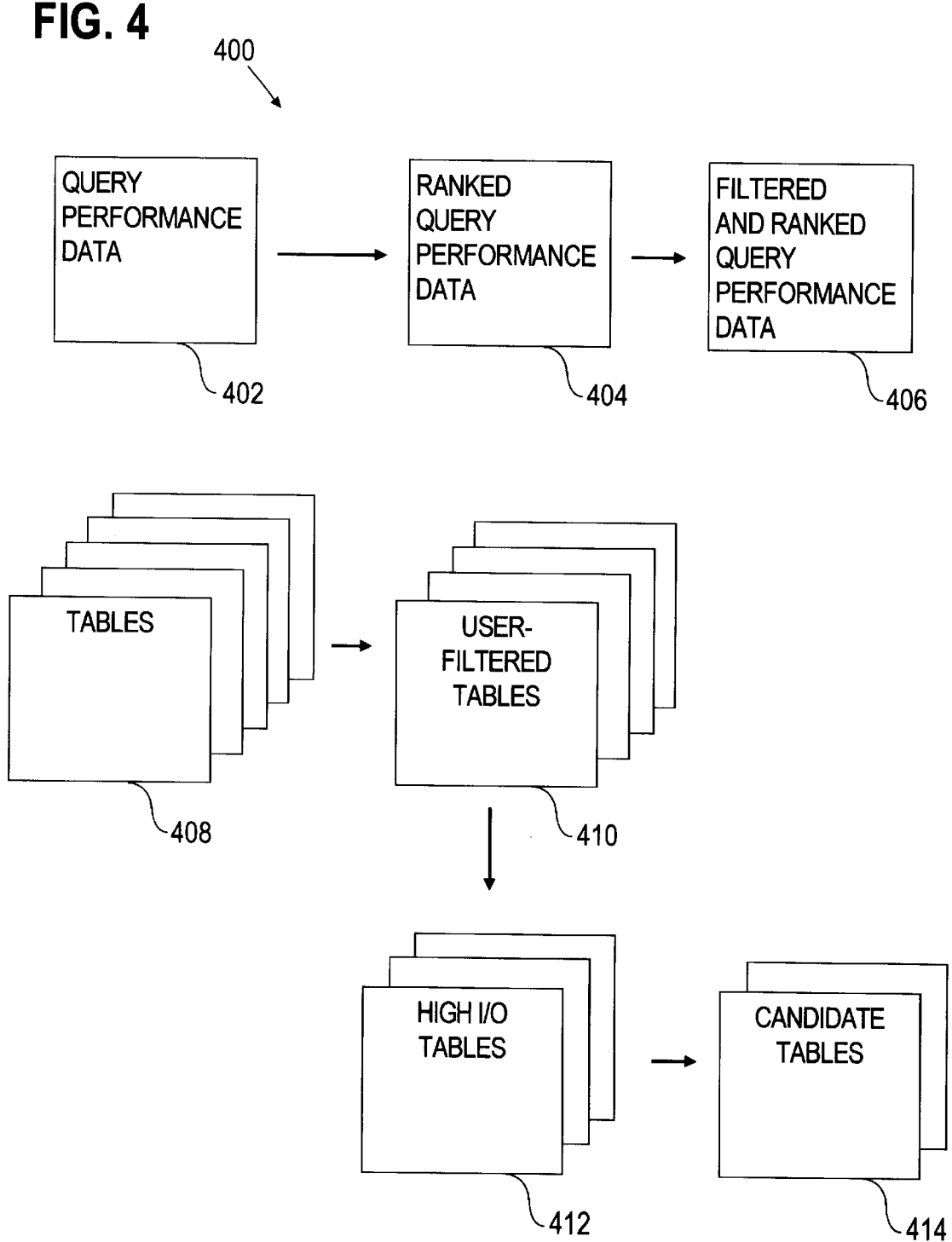

AUTOMATICALLY DETERMINING DATA THAT IS BEST SUITED FOR INDEX TUNING

FIELD OF THE INVENTION

The present invention relates to data management, and more specifically, to an approach for automatically identifying data that will benefit the most from index tuning.

BACKGROUND OF THE INVENTION

Information systems, and in particular database systems, typically organize and manage data in a manner that enhances the usefulness of the data. Indexes are valuable tools for reducing the amount of time required to retrieve data in information systems. In the context of database systems, an index is a mechanism that specifies the location of information in the database. A database index is conceptually similar to an index found at the end of a book, in that both kinds of indexes comprise an ordered list of information accompanied with the location of the information. In database systems, values in one or more columns of a table are stored in an index, which is maintained separately from the actual database table. Queries can then be processed against the index to retrieve the data more quickly than it is retrieved by searching the entire table.

The searching efficiency gained by using an index must be weighed against the overhead incurred by maintaining the index current. The negative costs are to storage and increased time for inserts, updates and delete operations. The positive cost is to queries which can take advantage of the index to minimize the number of rows accessed. Therefore, the net effect of some indexes is to increase efficiency, while the net effect of others is to decrease efficiency. The value of an index is largely determined by how the data is used.

The process of selecting and/or generating a set of indexes for data based upon characteristics of the data itself and/or characteristics of queries processed against the data is referred to as "index tuning." Since data may already have associated indexes, index tuning can involve making no changes to indexes, modifying existing indexes, creating new indexes or even deleting existing indexes that are unused.

An important issue in performing index tuning is determining which data is to be analyzed. Sometimes, index tuning is performed on all data in a database, regardless of which data might best benefit from index tuning. In the context of a database where data is organized in tables, this typically involves evaluating all tables in the database to identify the tables that should be indexed differently than they are currently indexed. This approach does have some drawbacks. First, evaluating every table in a database can consume a large amount of system resources. Second, evaluating every table in a database can take a long time, which is often unacceptable in active database systems. Thus, performing index tuning on all data in a database can interfere with other users and/or tasks being performed on the database system. For example, other processes may not be able to access particular data (e.g. a particular data table) while index tuning is being performed on the particular data.

Another approach for performing index tuning involves an operator, who in the context of a database system is typically referred to as a database administrator (DBA), manually selecting particular data on which index tuning is to be performed. Typically a DBA evaluates statistical information for a database to determine which data might most benefit from index tuning. In other words, which data will provide the greatest increase in performance when indexed differently than it is currently indexed, if at all. The DBA then initiates index tuning on the particular data.

One benefit of this approach is that index tuning is performed only on the data selected by the DBA, which can significantly reduce the amount of system resources and time required to perform index tuning. This can be particularly beneficial in situations where it is desirable to minimize the effects of index tuning on other processes.

Despite the advantages this approach provides over performing index tuning on all data in a database, this approach does have some drawbacks. In particular, a DBA must decide which data is to be processed with index tuning which, for large databases, can be very labor intensive. Moreover, the DBA may not make the best decisions about which data is to be index tuned. For example, the DBA may select data for index tuning that does not provide the most performance benefit (or no benefit at all) or not select other data that would provide a performance benefit. Consequently, although this approach may reduce the amount of system resources required to perform index tuning compared to the approach of evaluating all data in a database, it can be very labor intensive and may not provide optimal indexing because of errors attributable to the DBA's decisions.

Based on the need to perform index tuning and the limitations in the prior approaches for determining which data should be index tuned, an approach for automatically determining data that will benefit the most from index tuning that avoids the limitations in the approaches previously described is highly desirable.

SUMMARY OF THE INVENTION

According to one aspect of the invention, an approach is provided for automatically determining, from a plurality of bodies of data, which bodies of data are being accessed inefficiently, relative to other bodies of data from the plurality of bodies of data. First, query performance data is examined that indicates performance of a plurality of queries that access the plurality of bodies of data. Then particular bodies of data from the plurality of bodies of data that are being accessed inefficiently relative to other bodies of data from the plurality of bodies of data are selected based upon both the query performance data and a set of one or more candidate selection factors.

According to another aspect of the invention, the approach includes selecting particular queries from the plurality of queries based on one or more query selection criteria, and the set of one or more candidate selection factors includes whether a body of data is accessed during the processing of any of the particular queries.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 1 is a flow chart illustrating an approach for automatically determining data that is best suited for index tuning according to an embodiment of the invention;

FIG. 2 is a block diagram illustrating data tables selected for index tuning according to the approach illustrated in the flow chart of FIG. 1;

FIG. 3 is a flow chart illustrating an approach for automatically determining data that is best suited for index tuning according to another embodiment of the invention;

FIG. 4 is a block diagram illustrating tables selected for index tuning according to the approach illustrated in FIG. 3.

DETAILED DESCRIPTION OF THE INVENTION

Figure 5:
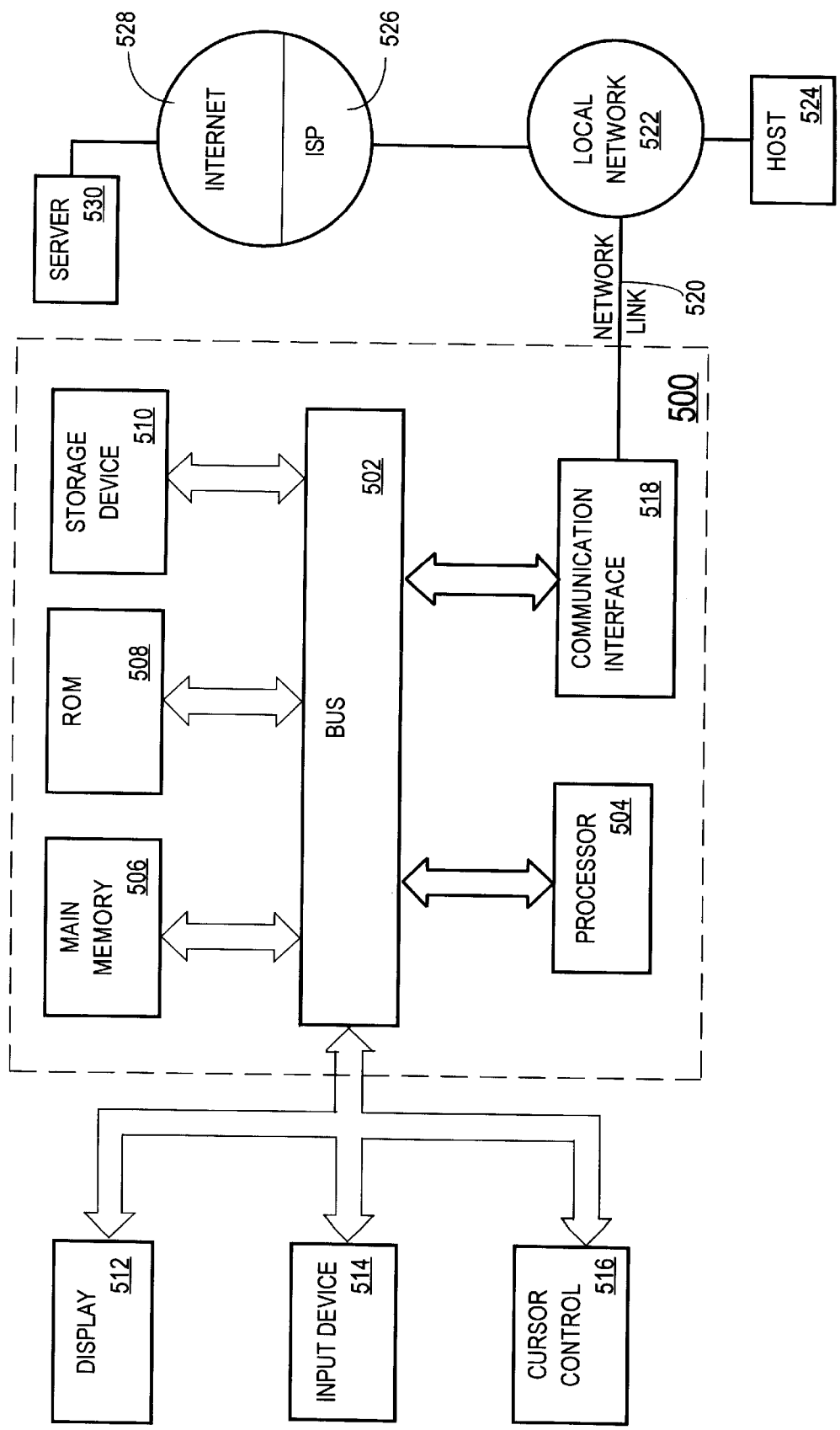
FIG. 5 is a block diagram of a computer system on which embodiments of the invention may be implemented.

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

FUNCTIONAL OVERVIEW

An approach for automatically determining which bodies of data are best suited for index tuning, according to an embodiment of the invention, generally involves analyzing performance data for a plurality of bodies of data to identify particular bodies of data from the plurality of bodies of data that would most benefit from index tuning. Index tuning may then be selectively applied to the particular bodies of data.

By automatically determining particular which bodies of data are best suited for index tuning and then selectively performing index tuning on only the particular bodies of data, time and resources are not expended to perform index tuning on other bodies of data that may provide a relatively smaller increase in performance, or no increase in performance at all. Furthermore, the automatic nature of the approach eliminates the need for a DBA to manually determine which bodies of data are best suited for index tuning.

DETAILED DESCRIPTION

The approach for automatically determining which bodies of data are best suited for index tuning, according to an embodiment of the invention, is now described in the context of database data tables with reference to a flowchart 100 of FIG. 1 and a block diagram 200 of FIG. 2.

After starting in step 102, in step 104, performance data 202 is retrieved. As described in more detail later, performance data 202 specifies an amount of system resources and/or time required to process queries on data tables 204.

In step 106, performance data 202 is analyzed to determine which particular data tables from the set of data tables 204 would most benefit from index tuning. In the present example, it shall be assumed that the performance data indicates that a relatively greater amount of resources, for example time, are required to process queries against particular data tables 206 than other data tables in the set of data tables 204. Therefore, data tables 206 are more likely to benefit from index tuning than other data tables in the set of data tables 204.

In step 108, index tuning is performed on particular data tables 206. The process is complete in step 110.

The approach for automatically determining which bodies of data are best suited for index tuning, according to an embodiment of the invention, is now described in more detail in the context of a database with reference to a flow chart 300 of FIG. 3 and a block diagram 400 of FIG. 4.

After starting in step 302, in step 304, query performance data 402 is collected. According to one embodiment of the invention, query performance data 402 specifies the average number of input/output operations (I/Os) required to process each query in a set of queries. In the context of databases, processing a query refers to satisfying the requirements of the query, while an I/O typically refers to a disk access. Thus, the average number of I/Os required to process a particular query is indicative of the number of disk accesses performed during execution of the query, which in turn is approximately proportional to the amount of time required to process the particular query.

In step 306 query performance data 402 is ranked by the average number of I/Os required to process each query to generate ranked query performance data 404. According to one embodiment of the invention, ranked query performance data 404 is ranked in descending order from the most number of I/Os per query execution to the least number of I/Os per query execution. For example, suppose query performance data 402 specifies the average number of I/Os per query execution as follows:

| Query ID | # of Times Executed | Avg. I/Os per Execution |
|----------|---------------------|-------------------------|
| Q1       | 5                   | 54                      |
| Q2       | 1                   | 257                     |
| Q3       | 7                   | 117                     |
| Q4       | 3                   | 193                     |
| Q5       | 2                   | 1                       |

After ranking query performance data 402 by average number of I/Os per execution in descending order, ranking query performance data 404 is as follows:

| Query ID | # of Times Executed | Avg. I/Os per Execution |
|----------|---------------------|-------------------------|
| Q2       | 1                   | 257                     |
| Q4       | 3                   | 193                     |
| Q3       | 7                   | 117                     |
| Q1       | 5                   | 54                      |
| Q5       | 2                   | 1                       |

In step 308, ranked query performance data 404 is filtered to generate filtered and ranked query performance data 406. According to one embodiment of the invention, filtering ranked query performance data 404 involves removing query performance data for queries that require one or fewer average I/Os to process, since these queries will not benefit from index tuning. In the prior example, query "Q5" would not be included in filtered and ranked query performance data 406 since query "Q5" has an average number of I/Os per execution of one. According to another embodiment of the invention a threshold value is used to filter ranked query performance data 404. For example, if a threshold value of one hundred (100) were used, then queries "Q1" and "Q5" would be excluded from filtered and ranked query performance data 406.

According to another embodiment of the invention, queries are filtered from ranked query performance data 404 based upon whether those queries experience a decrease in the average number of I/Os per execution after the tables accessed during the processing of the queries have been index tuned. For example, suppose query "Q2" was previously included in filtered and ranked query performance data 406 and that the tables accessed by query "Q2" were previously index tuned. Suppose further that query "Q2" has a prior average number of I/Os per execution of two hundred fifty (250). Since the current number of I/Os per execution is two hundred fifty seven (257), query "Q2" is excluded from filtered and ranked query performance data 406 under the assumption that further index tuning for this query will not provide a significant performance benefit. Note that this assumes that query "Q2" has not changed.

In step 310, a set of tables 408 is identified that were used (accessed) to process the queries associated with filtered and ranked query performance data 406. In step 312, one or more user-defined filters are optionally applied to tables 408 to generate user-filtered tables 410. The type of user-defined filter applied typically depends upon the requirements of a particular application. One example of a user-defined filter is a particular set of tables that a DBA designates for index tuning. Another example of a user-defined filter is a particular set of schemas that a DBA designates for index tuning. In the context of databases, a "schema" is a collection of database objects. A first DBA can identify those schemas that he is responsible for without having to know which "tables" he is responsible for that need index tuning.

Continuing now with the previous example, suppose that a threshold of one hundred (100) was applied to ranked query performance data 404 so that filtered and ranked query performance data 406 included queries "Q2", "Q4" and "Q3". The tables accessed during the processing of queries "Q2", "Q4" and "Q3" are indicated below:

| Query ID | # of Times Executed | Avg. I/Os per Execution | Tables Accessed |
|---|---|---|---|
| Q2 | 1 | 257 | A, B, C |
| Q4 | 3 | 193 | D, E |
| Q3 | 7 | 117 | B, F |

Thus, table 408 includes tables A, B, C, D, E and F, noting that table B was accessed during the processing of both query "Q2" and "Q3". A particular DBA may designate that only tables A–E be included in user-filtered tables 410, since the particular DBA is only interested in performing index tuning on tables A–E.

In step 314, a specified number of tables having the highest average number of I/Os per query execution are selected from user-filtered tables 410. The tables thus selected are illustrated as high I/O Tables 412. This step allows index tuning to be focused on a select number of data tables that are most likely to benefit from index tuning while reducing the amount of time and system resources that are required to perform index tuning. For example, in the prior example, tables A–C, associated with query "Q2" may be selected to be included in high I/O tables 412. The process is then complete in step 316. High I/O tables 412 may then be processed using conventional index tuning techniques. Embodiments of the invention are not limited to any particular type of index tuning.

FILTERING HIGH I/O TABLES

Sometimes a particular data table is selected for index tuning even though it would not be beneficial to perform index tuning on the table. This can occur for several reasons. For example, queries processed against a particular table may by their very nature require a large number of I/Os, even though the particular table is optimally indexed. An example of a query that characteristically requires a large number of I/Os is a query that requires a scan of an entire table. For purposes of explanation, these types of tables are referred to herein as "previously tuned tables." Previously tuned tables may have a high number of I/Os due more to the characteristics of the particular queries processed against them than to the manner in which the tables have been indexed. It is sometimes desirable to exclude previously tuned tables from index tuning to avoid wasting system resources and time performing index tuning on previously tuned tables. Provided hereinafter are three approaches for filtering high I/O tables 412 to produce the final tables 414 upon which index tuning will actually be performed.

1. Filtering High I/O Tables Based Upon Prior I/O Per Execution

If a table has high I/Os it is tuned. If the table continues to have high I/Os then it is unlikely that further tuning will improve performance. Therefore, according to one embodiment of the invention, high I/O tables 412 are filtered by comparing the current and prior average number of I/Os per query execution for each table. That is, for each of high I/O tables 412, the current number of I/Os per query execution is compared to prior average number of I/Os per query execution. Tables whose current number of I/Os per query execution is within a specified range of the prior average number of I/Os per query execution are not finally selected for index tuning. An example of a suitable range is approximately 10%, although embodiments of the invention are not limited to any particular threshold range. A single range may be used for all high I/O tables 412 or ranges may be separately determined for each table. As a result, for those tables that have a sufficiently high average number of I/Os per query execution to be selected for index tuning, only those tables that experience an increase in the average number of I/Os per query execution that exceeds the specified range are included in candidate tables 414. Tables with no prior average number of I/Os per query execution are finally selected for index tuning. When a table is tuned, I/Os per execution are recollected and saved as the prior average number of I/Os per execution.

Referring to the prior example, suppose that high I/O tables 412 include tables A, B and C and that tables A, B and C have the following current and prior average number of I/Os per execution:

| Table | Current I/Os Per Execution | Prior Avg. I/Os Per Execution |
|---|---|---|
| A | 278 | 270 |
| B | 98 | 32 |
| C | 359 | 369 |

The current number of I/Os per execution is determined from the number of I/Os per query for either a specified number of the most recent queries or all queries within a specified period of time. For example, the current number of I/Os per execution may be calculated based upon the last three queries or all queries executed within the last three minutes. The prior average number of I/Os per execution is calculated based upon either a specified number of queries or all queries executed within a specified time prior to the queries used to calculate the current number of I/Os per execution.

In the present example, for a specified range of 10%, tables A and C are not included in candidate tables 414 since for both table A and C, the current number of I/Os per execution is within 10% of their respective prior average number of I/Os per execution.

2. Filtering High I/O Tables Using a Workload Threshold

According to another embodiment of the invention, high I/O tables are filtered by removing particular high I/O tables from index tuning based upon "workload" information that is maintained for each table. The workload for a particular table is the number of queries that required access to the particular table during a specified amount of time. In general, tables with a relatively higher workload are better candidates for index tuning than tables with a relatively lower workload because performing index tuning on the tables with the relatively higher workload is more likely to provide a performance benefit. Therefore, according to one embodiment of the invention, high I/O tables 412 that have been selected for index tuning but that do not satisfy a workload threshold are not included in candidate tables 414 and are therefore eliminated from index tuning. For example, suppose tables A, B and C have the following workloads:

| Table | Workload |
|-------|----------|
| A     | 27       |
| B     | 17       |
| C     | 31       |

For a workload threshold of twenty-five (25), table B is filtered from high I/O tables 412 and not included in candidate tables 414.

3. Filtering High I/O Tables Using Workload Trend/Criteria

According to another embodiment of the invention, high I/O tables 412 are filtered based upon workload trend criteria. This approach eliminates from index tuning data tables that have both been initially selected for index tuning and satisfied the workload threshold, but for which index tuning is not likely to be as beneficial based on workload trend criteria.

According to one embodiment of the invention, the workload trend criteria specifies a minimum increase in workload for a particular data table over prior workloads for the data table. For example, suppose a particular data table both has been initially selected for index tuning and satisfies a specified workload threshold. The current workload for the particular table is compared to prior workloads for the particular table. If the prior workload for the particular table does not exist, then the particular table is included in candidate tables 414. If the current workload for the particular table exceeds the prior workloads for the particular table by a workload trend threshold, then the particular table is included in candidate tables 414 and the prior workload is set to the current workload. If not, then the particular table is not included in candidate tables 414. The current workload for a particular table is the number of queries that required access to the particular table during a particular specified period of time. The prior workload for the particular table is the number of queries that required access to the particular table during another specified period of time prior to the particular specified period of time.

Consider the current and prior workloads for tables A, B and C as follows:

| Table | Current Workload | Prior Workload |
|-------|------------------|----------------|
| A     | 27               | 26             |
| B     | 17               | 9              |
| C     | 31               | 25             |

For a workload trend threshold of 10%, table A is filtered out and not included in candidate tables 414 since the current workload for table A is within 10% of the prior workload for table A. Both tables B and C are included in tables 414 since their respective current workloads are not within 10% of their prior workloads. This approach provides a preference for tables that experience an increase in workload, i.e., the total number of queries that require access to the tables.

Although embodiments of the invention have primarily been described herein in the context of performing index tuning on database tables, the approach described herein is applicable to any type of data that can be indexed, regardless of the particular mechanism used to maintain the data. Moreover, embodiments of the invention are applicable to any type or form of data residing in any medium. Examples include, but are not limited to, data residing or being carried on any type of volatile or non-volatile storage or any type of wire-based or wireless connection, link, or network.

Although query performance data has generally been used herein to mean a number of I/Os per query execution, query performance data may also mean I/Os per body of data per query or I/Os per body of data during a specified period of time.

Furthermore, although embodiments of the invention have primarily been described herein in the context of identifying the least-efficiently accessed bodies of data for the purpose of performing index tuning, the invention is not limited to using the least-efficiently accessed bodies of data for index tuning. This information may be used for other purposes. For example, once the data that is least-efficiently accessed has been identified, this information may be used in other ways to increase the speed of access to this data.

In addition, embodiments of the invention are applicable to any type of indexing scheme and are not limited to a particular indexing scheme.

IMPLEMENTATION MECHANISMS

The communication architecture for performing work in a distributing computing system as described herein may be implemented in hardware circuitry, in computer software, or a combination of hardware circuitry and computer software. The communication architecture described herein in accordance with the present invention is not limited to a particular type of messaging protocol. For example, node-to-node communication may be implemented with remote procedure calls (RPCs) or any other messaging protocol for requesting that work be performed on a remote node.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for automatically determining data that is best suited for index tuning. According to one embodiment of the invention, automatically determining data that is best suited for index tuning is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for automatically determining data that is best suited for index tuning as described herein.

The received code may be executed by processor 504 as it is received, and/or stored in storage device 510, or other non-volatile storage for later execution. In this manner, computer system 500 may obtain application code in the form of a carrier wave.

The approach described herein for automatically determining data that is best suited for index tuning provides several advantages over prior approaches. By automatically determining particular data that is best suited for index tuning and then selectively performing index tuning on the particular data, time and resources are not expended on performing index tuning on other data that may benefit from index tuning to a lesser degree or not at all. Furthermore, the automatic nature of the approach eliminates the need for a DBA to determine data that is to be processed using index tuning.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for automatically determining, from a plurality of bodies of data, which bodies of data are being accessed inefficiently, relative to other bodies of data from the plurality of bodies of data, the method comprising the computer implemented steps of:

examining query performance data that indicates performance of a plurality of queries that access the plurality of bodies of data; and selecting, based upon both the query performance data and a set of one or more candidate selection factors, particular bodies of data from the plurality of bodies of data that are being accessed inefficiently relative to other bodies of data from the plurality of bodies of data.

2. The method as recited in claim 1, wherein:

the method further comprises the step of selecting particular queries from the plurality of queries based on one or more query selection criteria, and the set of one or more candidate selection factors includes whether a body of data is accessed during the processing of any of the particular queries.

3. The method as recited in claim 2, wherein:

the query performance data specifies an amount of time required to execute each of the plurality of queries, and the step of selecting particular queries from the plurality of queries based upon one or more query selection criteria includes selecting particular queries from the plurality of queries based upon the amount of time required to execute each of the plurality of queries.

4. The method as recited in claim 2, wherein:

the query performance data specifies an average number of input/output operations (I/Os) required to execute each of the plurality of queries, and the step of selecting particular queries from the plurality of based upon one or more query selection criteria includes selecting particular queries from the plurality of queries based upon the average number of I/Os required to execute each of the plurality of queries.

5. The method as recited in claim 4, wherein the steps of selecting particular queries from the plurality of queries based upon the average number of I/Os required to execute each of the plurality of queries includes selecting particular queries from the plurality of queries based upon the average number of I/Os required to execute each of the plurality of queries and a threshold number of I/Os per query.

6. The method as recited in claim 2, wherein:

the set of one or more candidate selection factors further includes whether a body of data has been designated by a user, and the step of selecting particular bodies of data from the plurality of bodies of data is performed based upon whether a body of data has been designated by a user and is accessed during the processing of any of the particular queries.

7. The method as recited in claim 2, wherein:

the set of one or more candidate selection factors further includes whether a current number of input/output operations (I/Os) per query execution is within a specified range of a prior average number of I/Os per query execution, and the step of selecting particular bodies of data from the plurality of bodies of data is performed based upon whether a body of data has been accessed during the processing of any of the particular queries and whether a current number of I/Os per query execution for the body of data is within a specified range of a prior average number of I/Os per query execution for the body of data.

8. The method as recited in claim 2, wherein:

the set of one or more candidate selection factors includes whether a body of data has been accessed by at least specified number of queries during a specified period of time, and the step of selecting particular bodies of data from the plurality of bodies of data is performed based upon whether a body of data is accessed at least a specified number of the particular queries during a specified period of time.

9. The method as recited in claim 2, wherein:

the set of one or more candidate selection factors include whether the number of the particular queries that accessed a body of data during a first specified period of time within a specified range of the number of the particular queries that accessed the body of data during a second specified period of time, and the step of selecting particular bodies of data from the plurality of bodies of data is performed based upon whether the number of the particular queries that accessed the body of data during a first specified period of time is within a specified range of the number of the particular queries that accessed the body of data during a second specified period of time.

10. A method for performing index tuning on particular tables from a plurality of tables in a database system, the method comprising the computer-implemented steps of:

selecting particular queries from a plurality of queries based upon the performance of the plurality of queries;

identifying a set of one or more tables accessed during the execution of the particular queries;

selecting particular tables from the set of one or more tables based upon table selection criteria; and performing index tuning on the particular tables.

11. A computer-readable medium carrying one or more sequences of one or more instructions for automatically determining, from a plurality of bodies of data, which bodies of data are being accessed inefficiently, relative to other bodies of data from the plurality of bodies of data, the one or more sequences of one or more instructions including instructions which, when executed by one or more processors, cause the one or more processors to perform the steps of:

examining query performance data that indicates performance of a plurality of queries that access the plurality of bodies of data; and selecting, based upon both the query performance data and a set of one or more candidate selection factors, particular bodies of data from the plurality of bodies of data that are being accessed inefficiently relative to other bodies of data from the plurality of bodies of data.

12. The computer-readable medium as recited in claim 11, wherein:

the instructions include instructions for selecting particular queries from the plurality of queries based on one or more query selection criteria, and the set of one or more candidate selection factors includes whether a body of data is accessed during the processing of any of the particular queries.

13. The computer-readable medium as recited in claim 12, wherein:
the query performance data specifies an amount of time required to execute each of the plurality of queries, and
the step of selecting particular queries from the plurality of queries based upon one or more query selection criteria includes selecting particular queries from the plurality of queries based upon the amount of time required to execute each of the plurality of queries.

14. The computer-readable medium as recited in claim 12, wherein:
the query performance data specifies an average number of input/output operations (I/Os) required to execute each of the plurality of queries, and
the step of selecting particular queries from the plurality of based upon one or more query selection criteria includes selecting particular queries from the plurality of queries based upon the average number of I/Os required to execute each of the plurality of queries.

15. The computer-readable medium as recited in claim 14, wherein the steps of selecting particular queries from the plurality of queries based upon the average number of I/Os required to execute each of the plurality of queries includes selecting particular queries from the plurality of queries based upon the average number of I/Os required to execute each of the plurality of queries and a threshold number of I/Os per query.

16. The computer-readable medium as recited in claim 12, wherein:
the set of one or more candidate selection factors further includes whether a body of data has been designated by a user, and
the step of selecting particular bodies of data from the plurality of bodies of data is performed based upon whether a body of data has been designated by a user and is accessed during the processing of any of the particular queries.

17. The computer-readable medium as recited in claim 12, wherein:
the set of one or more candidate selection factors further includes whether a current number of input/output operations (I/Os) per query execution is within a specified range of a prior average number of I/Os per query execution, and
the step of selecting particular bodies of data from the plurality of bodies of data is performed based upon whether a body of data has been accessed during the processing of any of the particular queries and whether a current number of I/Os per query execution for the body of data is within a specified range of a prior average number of I/Os per query execution for the body of data.

18. The computer-readable medium as recited in claim 12, wherein:
the set of one or more candidate selection factors includes whether a body of data has been accessed by at least specified number of queries during a specified period of time, and
the step of selecting particular bodies of data from the plurality of bodies of data is performed based upon whether a body of data is accessed at least a specified number of the particular queries during a specified period of time.

19. The computer-readable medium as recited in claim 12, wherein:
the set of one or more candidate selection factors include whether the number of the particular queries that accessed a body of data during a first specified period of time within a specified range of the number of the particular queries that accessed the body of data during a second specified period of time, and
the step of selecting particular bodies of data from the plurality of bodies of data is performed based upon whether the number of the particular queries that accessed the body of data during a first specified period of time is within a specified range of the number of the particular queries that accessed the body of data during a second specified period of time.

20. A computer system for automatically determining, from a plurality of bodies of data, which bodies of data are being accessed inefficiently, relative to other bodies of data from the plurality of bodies of data, the computer system comprising: one or more processors; and
a memory coupled to the one or more processors and containing one or more sequences of one or more instructions which, when executed by the one or more processors, cause the one or more processors to perform the steps of:
examining query performance data that indicates performance of a plurality of queries that access the plurality of bodies of data; and
selecting, based upon both the query performance data and a set of one or more candidate selection factors, particular bodies of data from the plurality of bodies of data that are being accessed inefficiently relative to other bodies of data from the plurality of bodies of data.

21. The computer system as recited in claim 20, wherein:
the instructions include instructions for
selecting particular queries from the plurality of queries based on one or more query selection criteria, and
the set of one or more candidate selection factors includes whether a body of data is accessed during the processing of any of the particular queries.

22. The computer system as recited in claim 21, wherein:
the query performance data specifies an amount of time required to execute each of the plurality of queries, and
the step of selecting particular queries from the plurality of queries based upon one or more query selection criteria includes selecting particular queries from the plurality of queries based upon the amount of time required to execute each of the plurality of queries.

23. The computer system as recited in claim 21, wherein:
the query performance data specifies an average number of input/output operations (I/Os) required to execute each of the plurality of queries, and
the step of selecting particular queries from the plurality of based upon one or more query selection criteria includes selecting particular queries from the plurality of queries based upon the average number of I/Os required to execute each of the plurality of queries.

24. The computer system as recited in claim 23, wherein the steps of selecting particular queries from the plurality of queries based upon the average number of I/Os required to execute each of the plurality of queries includes selecting particular queries from the plurality of queries based upon the average number of I/Os required to execute each of the plurality of queries and a threshold number of I/Os per query.

25. The computer system as recited in claim 21, wherein:
the set of one or more candidate selection factors further includes whether a body of data has been designated by a user, and the step of selecting particular bodies of data from the plurality of bodies of data is performed based upon whether a body of data has been designated by a user and is accessed during the processing of any of the particular queries.

26. The computer system as recited in claim 21, wherein:

the set of one or more candidate selection factors further includes whether a current number of input/output operations (I/Os) per query execution is within a specified range of a prior average number of I/Os per query execution, and the step of selecting particular bodies of data from the plurality of bodies of data is performed based upon whether a body of data has been accessed during the processing of any of the particular queries and whether a current number of I/Os per query execution for the body of data is within a specified range of a prior average number of I/Os per query execution for the body of data.

27. The computer system as recited in claim 21, wherein:

the set of one or more candidate selection factors includes whether a body of data has been accessed by at least specified number of queries during a specified period of time, and the step of selecting particular bodies of data from the plurality of bodies of data is performed based upon whether a body of data is accessed at least a specified number of the particular queries during a specified period of time.

28. The computer system as recited in claim 21, wherein:

the set of one or more candidate selection factors include whether the number of the particular queries that accessed a body of data during a first specified period of time within a specified range of the number of the particular queries that accessed the body of data during a second specified period of time, and the step of selecting particular bodies of data from the plurality of bodies of data is performed based upon whether the number of the particular queries that accessed the body of data during a first specified period of time is within a specified range of the number of the particular queries that accessed the body of data during a second specified period of time.

\* \* \* \* \*